United States Patent [19]

Cortesi et al.

[11] Patent Number: 5,036,965
[45] Date of Patent: Aug. 6, 1991

[54] ACTUATOR DEVICE PARTICULARLY SUITED TO ACTIVATING THE FRICTION CLUTCH OF A MOTOR VEHICLE

[75] Inventors: Giorgio Cortesi, Brescia; Giorgio Lupo, Rivalta, both of Italy

[73] Assignee: Iveco Fiat S.p.A., Turin, Italy

[21] Appl. No.: 528,061

[22] Filed: May 23, 1990

[30] Foreign Application Priority Data

May 26, 1989 [IT] Italy .................. 67403 A/89

[51] Int. Cl.⁵ .................................. F16D 19/00
[52] U.S. Cl. ........................ 192/85 R; 60/547.1
[58] Field of Search ............ 192/85 C, 85 R; 60/545, 60/538, 547.1, 593

[56] References Cited

U.S. PATENT DOCUMENTS

| | | | |
|---|---|---|---|
| 4,513,850 | 4/1985 | Plate | 192/3.58 |
| 4,708,405 | 11/1987 | Belart et al. | 60/547.1 X |
| 4,750,789 | 6/1988 | Belart et al. | 60/547.1 X |
| 4,761,042 | 8/1988 | Seibert et al. | 60/547.1 X |
| 4,781,026 | 11/1988 | Kuromitsu | 60/547.1 |
| 4,831,826 | 5/1989 | Belart et al. | 60/547.1 X |
| 4,834,467 | 5/1989 | Zirps | 60/547.1 X |
| 4,850,655 | 7/1989 | Takata et al. | 60/547.1 |
| 4,903,487 | 2/1990 | Leiber | 60/547.1 |
| 4,914,917 | 4/1990 | Schonlau | 60/547.1 X |

FOREIGN PATENT DOCUMENTS

| | | |
|---|---|---|
| 0136267 | 4/1985 | European Pat. Off. |
| 0231465 | 8/1987 | European Pat. Off. |
| 3545500 | 7/1987 | Fed. Rep. of Germany |
| 58-72725 | 4/1983 | Japan |

OTHER PUBLICATIONS

Japan Patent Abstracts of Japan, vol. 7, No. 165 (M-230) (1310) Jul. 20, 1983.

*Primary Examiner*—Allan D. Herrmann
*Assistant Examiner*—Nicholas Whitelaw
*Attorney, Agent, or Firm*—Kane Dalsimer Sullivan Kurucz Levy Eisele and Richard

[57] ABSTRACT

An actuation device for activating a friction clutch of a motor vehicle including a cylinder for activating the clutch and control unit for supplying a pressurized fluid to the cylinder at a rate that is proportion to the force exerted on the clutch pedal.

8 Claims, 4 Drawing Sheets 5,036,965

ACTUATOR DEVICE PARTICULARLY SUITED TO ACTIVATING THE FRICTION CLUTCH OF A MOTOR VEHICLE

BACKGROUND OF THE INVENTION

The present invention relates to an actuator device, particularly suited to activating the friction clutch of a motor vehicle.

Known servodriven actuators for activating the friction clutch of motor vehicles substantially comprise a hydraulic cylinder, the piston of which is connected to a clutch activation lever; said cylinder is supplied with pressurized oil, the flow and pressure of which is controlled by a valve in proportion to the force exerted by the driver of the motor vehicle on the friction clutch pedal. Actuators of this type present several drawbacks. First of all, actuators of this type are not suitable for complete automation (irrespective of the driver's action) of the clutch engagement and disengagement manoeuvres and gear selection and engagement manoeuvres on a conventional type mechanical gearbox.

Furthermore, in a vehicle equipped with an actuator of this type, it is sometimes impossible to perform the clutch engagement manoeuvres and thus gear engagement when the actuator wears out. Finally, actuators of the type described above occupy considerable space and are rather unreliable, due to the large number of components they comprise and of pipes required to make the hydraulic connection between the various components.

SUMMARY OF THE INVENTION

The object of the present invention is to provide an actuator device which overcomes the drawbacks described previously.

One of the objects of the invention is therefore to provide an actuator device that substantially presents three different modes of operation: direct activation of the friction clutch obtained, in the conventional manner, by pressing directly on the clutch pedal; activation of the friction clutch by the driver of the vehicle pressing on the clutch pedal but with power assistance provided by an actuator; finally, automatic activation of the friction clutch, obtained without any action taken by the driver and on the basis of programmes stored in an electronic control unit.

According to the present invention there is provided an actuator device particularly suited to activating the friction clutch of a motor vehicle, characterized in that it comprises:

a hydraulic cylinder for activating the clutch;
a control unit adapted for supplying pressurized oil to said hydraulic activating cylinder, that comprises:
 a structure in which a first and second cylindrical cavity are machined side by side, the first of which has a greater diameter than the second;
 a couple of pistons securely fixed to each other and free to move inside said cavities, a first of which defines, with the lateral surface and with one of the rear surfaces of said first cavity, a first chamber, and the second of which defines, with the lateral surface and with one of the rear surfaces of said second cavity, a second chamber which is linked to said hydraulic activating cylinder;
 an activating terminal for said pistons, free to move axially, substantially in the same direction as the pistons, and connected to the clutch pedal, said terminal being housed in an axial hole of a rod securely fixed to said pistons, so as to rest on the rear surface of said hole;
 a mechanically driven flow control valve adapted to enable oil to flow between a pressurized oil source and said first chamber and between said chamber and a discharge outlet, at a rate that is proportional to an activating force;
 a electromagnetically driven pressure control valve adapted to generate, by means of the pressure of said fluid, said activating force for said flow control valve, said activating force being proportional to an electrical signal transmitted to the pressure control valve;
 a sensor adapted to generate an electrical signal that is proportional to the force exerted on said clutch pedal and a circuit for activating said pressure control valve connected to said sensor and adapted to emit said electrical signal for said pressure control valve in proportion to said electrical signal emitted by said sensor.

BRIEF DESCRIPTION OF THE DRAWINGS

The invention will be described by way of example, with reference to the accompanying drawings in which.

DETAILED DESCRIPTION OF THE INVENTION

Figure 1:
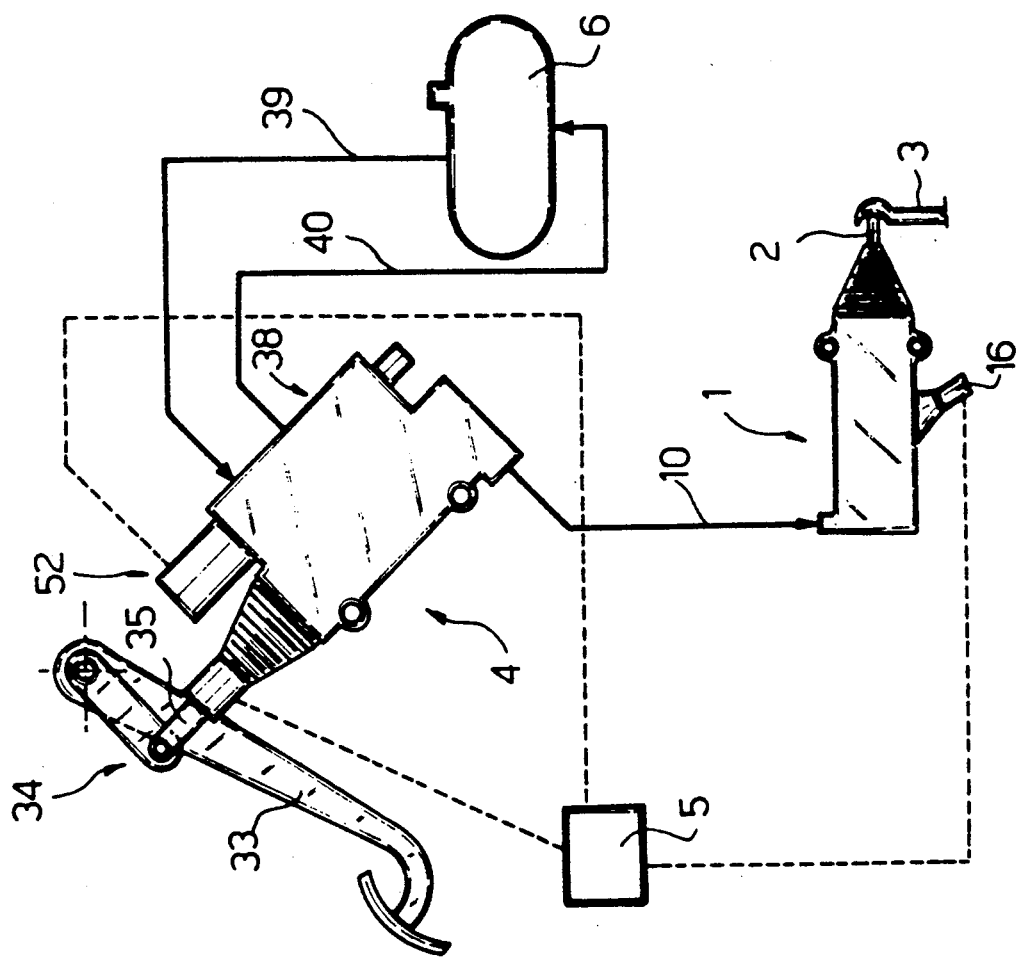
FIG. 1 is a schematic representation of the main components of the device constituting the invention.
Figure 2:
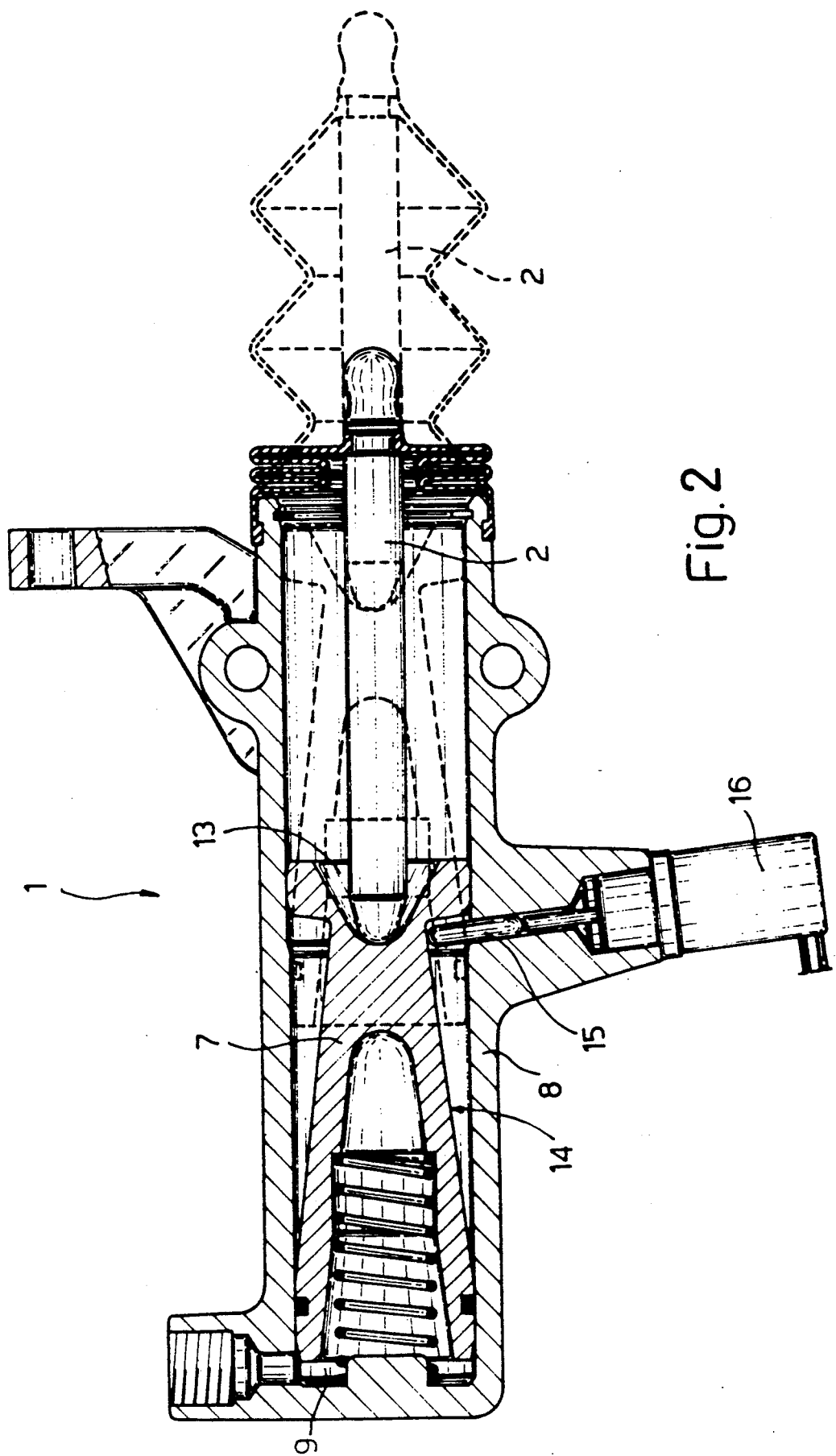
FIG. 2 is a sectional view of a hydraulic activating cylinder of the friction clutch that forms part of the device.

The control device constituting the invention, in accordance with the embodiment illustrated in FIG. 1, substantially comprises a hydraulic cylinder activating friction clutch 1, that can have suitably the structure of the one represented in FIG. 2, and a rod 2 of which acts directly on a clutch activating lever 3; a control unit 4 adapted to supply pressurized oil to cylinder 1; an electrical activating circuit 5 of said unit and a pressurized oil source 6, substantially comprising a pump activated by a motor and at least a pair of collection tanks (not represented), one for the pressurized oil supplied to unit 4 and the other for the oil discharged from said unit.

As can clearly be seen from FIG. 2, cylinder 1 may substantially comprise a piston 7, free to move inside a sheel 8, and defining with the walls of said shell a chamber 9 for the pressurized oil, linked, in the manner described later on, via pipe 10 (FIG. 1), to unit 4. This piston suitably presents an end cavity 13 inside which rests an end of rod 2, while the opposite end rests on a special slot of lever 3 (FIG. 1).

Lateral surface 14 of piston 7 is suitably conical and interacts with a sensor 15 of a detector 16, adapted to emit electrical signals that are proportional to the axial movement of piston 7.

Control unit 4 (FIGS. 3 and 4) substantially comprises a structure 17 in which two cylindrical cavities 18 and 19 are machined in connection with each other, the first of which has a greater diameter than the second; suitably, the second cavity is machined inside a cover 20 inserted in cavity 18. A pair of pistons 21 and 22 securely fixed to each other are free to move inside, respectively, cavities 18 and 19; piston 21 defines, with lateral surface 23 and rear surface 24 of cavity 18, a chamber 25, while the second piston 22 defines, with lateral surface 26 and rear surface 27 of cavity 19, another chamber 28 which is linked, via pipe 10 (FIG. 1), to chamber 9 (FIG. 3) of hydraulical activating cylinder 1.

Figure 3:
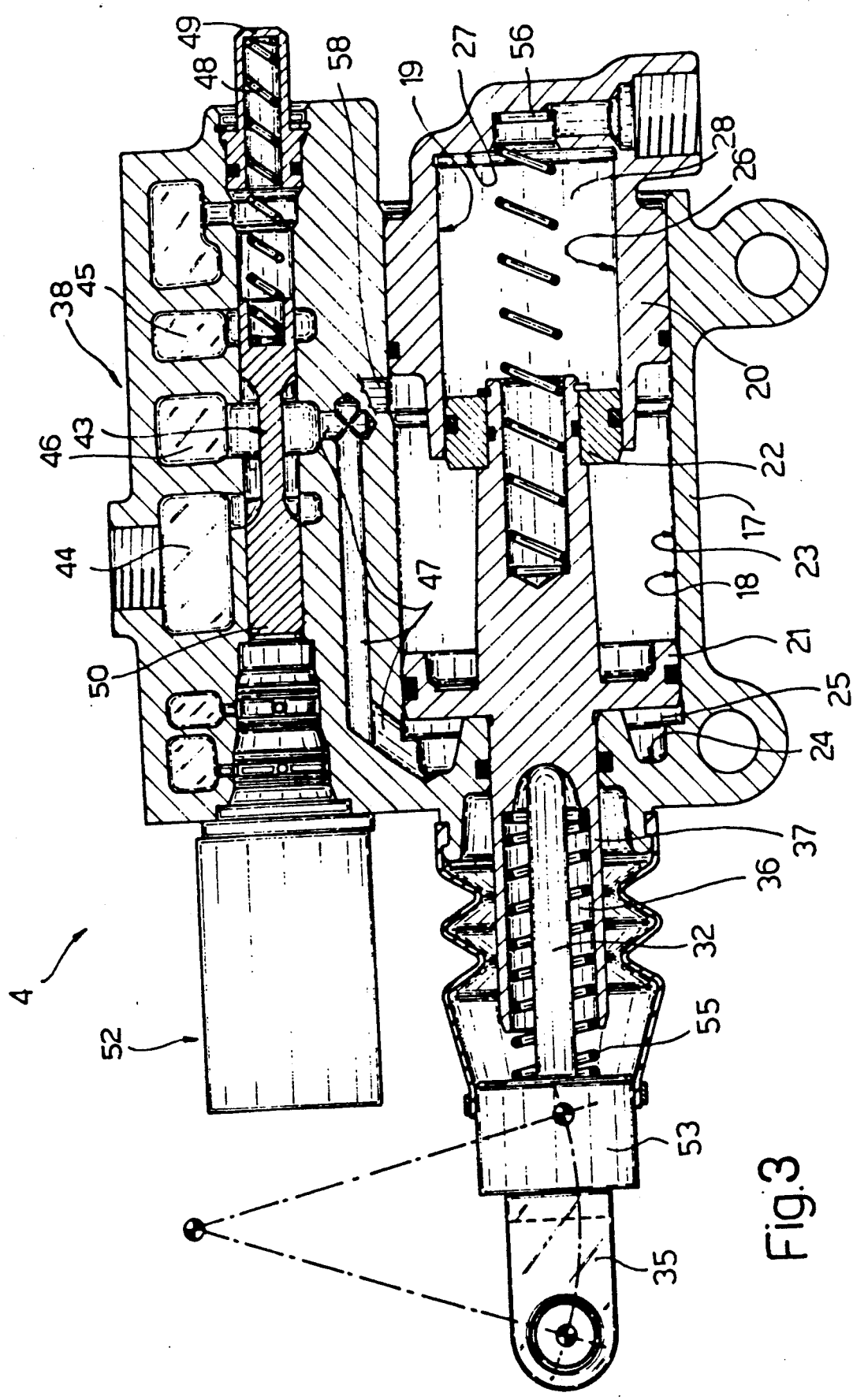
FIGS. 3 and 4 are sectional views of a control unit forming a part of the device, in two different operational configurations.

The device also comprises a terminal 32 for activating pistons 21 and 22, which is free to move in a substantially axial direction along the axis of the pistons and is connected to clutch pedal 33 (FIG. 1). Said connection may be made in any suitable manner, for example, by means of a mechanical transmission shaft 34 that acts on a fork 35 securely fixed to the terminal. Said terminal, as can clearly be seen from FIGS. 3 and 4, is housed in an axial hole 36 on rod 37 securely fixed to pistons 21 and 22, so as to rest on the rear surface of the rod as illustrated in FIG. 3.

The device also comprises a mechanically driven flow control value indicated on the overall diagram by 38, which is adapted to enable pressurized oil to flow from pipe 39 (FIG. 1) to chamber 25 of unit 4 and from said unit to the discharge outlet via a pipe 40.

Figure 4:
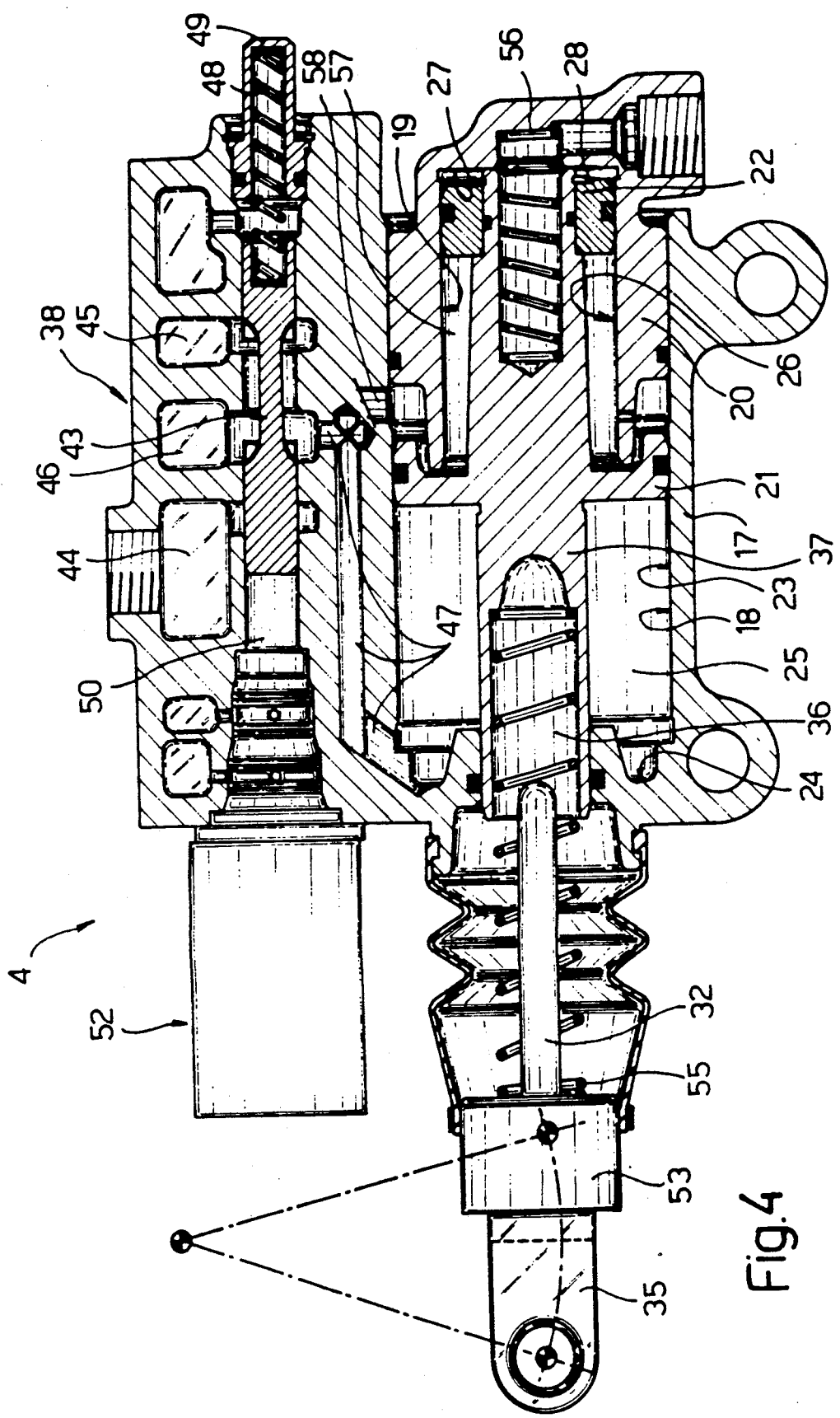

Flow control valve 38 may have suitably the structure illustrated in FIG. 4 and thus comprise blocking member 43 free to move axially inside an axial hole of the structure of the valve; said member is adapted to link alternately a discharge chamber 44 or a supply chamber 45 with an intermediate chamber 46, in turn linked with chamber 18 through holes 47. To one end of blocking member 43 is applied the force exerted by a helical spring 48 placed between said end and a cover 49; the other end of member 43 is inserted inside a cavity 50 into which a hydraulic fluid flows at a pressure controlled by a pressure control valve 52; said blocking member is thus in equilibrium between the force exerted by spring 48 and the force created by the pressures of the fluid in chamber 50.

Pressure control valve 52, which may be of any known type, varies the pressure inside cavity 50 in proportion to an electrical signal that is transmitted to it by activating circuit 5 (FIG. 1).

The device also comprises a sensor 53 adapted to generate an electrical signal in proportion to the force exerted on clutch pedal 33; suitably, this sensor may comprise a load cell arranged in series with activating terminal 32, as represented in the embodiment illustrated in FIG. 3; in this case, said load cell is set between fork 35 and terminal 32, so that it is sensitive to the forces that are transmitted from said fork to said terminal.

Suitably, between terminal 32 and rod 37, a helical spring 55 is placed, adapted to move the terminal away from the rod; this spring is suitably housed inside hole 36. Furthermore, another spring 56 is set between piston 22 and rear surface 27 of cavity 19, so as to move piston 22 away from said surface. A chamber, indicated by 57, is created between pistons 21 and 22 and the lateral surfaces of cavities 18 and 19; said chamber is linked, via a pipe 58, to a discharge tank forming part of source 6.

Activating circuit 5 (FIG. 1) may comprise an electronic control unit, that processes the signals it receives from sensors 53 and 16, and on the basis of appropriate programmes that are stored inside the control unit, emits signals for activating valve 52. The operation of the device described is as follows. The device may first of all be used for creating an actuator for control of clutch engagement and disengagement maneuvers by means of pedal 33 (FIG. 1), so as to apply to clutch activating lever 3 an activating force that are proportional to that applied to said pedal. When used in this way, the device constitutes a stress multiplier adapted to create a desired ratio between the activating force transmitted to lever 3 and that applied to pedal 33 by the driver of the vehicle. To enable this mode of operation, activating circuit 5 is preset so as to convert the electrical signals generated by load cell 53 into signals for activating pressure control valve 52, the value of which is proportional to that of the previous signals.

In this operating mode, when clutch pedal 33 is activated, the force transmitted to terminal 32 generates, via load cell 53, a corresponding electrical signal which, via activating circuits 5, controls pressure control valve 52: thus, the pressure of the hydraulic fluid inside cavity 50, controlled by said valve, increases in proportion to the activating stress on pedal 33. Blocking member 43 therefore moves to the right starting from the position shown in FIG. 3, to the one shown in FIG. 4, in which supply chamber 45 is linked with intermediate chamber 46, enabling the pressurized fluid to flow through pipes 47 into chamber 25 (FIG. 4). In this way, pistons 21 and 22 are moved securely to the right, letting the oil in chamber 28 flow into chamber 9 (FIG. 2) of hydraulic activating cylinder 1 thus causing the relative piston to move to the right. The flow rate of the hydraulic fluid into chamber 25 is therefore in proportion to the pressure inside cavity 50 controlled by valve 52 and thus proportional to the force applied to clutch pedal 33.

As can be seen, the pressure at each moment inside chamber 28 is greater than inside chamber 25 due to the different diameter of pistons 21 and 22. This device may have another operating mode if it is used as part of a system for automatic control of a mechanical gearbox. In this case, activating circuit 5 comprises an electronic control unit that is preset to transmit activating signals to pressure control valve 50 after the signals received from sensors 53 and 16 have been processed and on the basis of appropriately predetermined programmes. If the unit is used in this application it can exert an activating force on cluch lever that varies in a desired manner in time during the clutch engagement and disengagement maneuvers, so that these maneuvers are carried out in the most favourable conditions to make them smooth and regular, and to reduce the energy dissipation which takes place during the contact between the surfaces of friction. It is in fact evident that the quantity of hydraulic fluid supplied to chamber 25 may be suitably modulated to achieve the optimum conditions mentioned previously, by varying the level of the activating signals that are transmitted to pressure control valve 52 from electronic control unit 5.

If, in this second operating mode, the driver of the vehicle presses clutch pedal 33, no disturbance is transmitted to pistons 21 and 22: in fact, as soon as piston 21 moves to the right, the rear surface of hole 36 moves away from the end of terminal 32 and in the piston travel end position, the situation illustrated in FIG. 4 is created; as can clearly be seen, in this configuration, a movement of terminal 32 to the right would have no effect on the movement of pistons 21 and 22.

Finally, the device has a third operating mode, which consists in the transmission of pressurized oil into chamber 9 of activating cylinder 1 obtained following the movement of pistons 21 and 22 to the right, mechanically driven by terminal 32. This is the mode in which the device operates when it cannot operate in either of the two operating modes set forth above, due to some part of the device wearing out.

It is therefore obvious that the force and layout of the various parts forming the device described may be modified without exceeding the scope of the invention.

We claim:

1. An actuator device particularly suited to activating the friction clutch of a motor vehicle, characterized in that it comprises:
    a hydraulic cylinder (1) for activating the clutch; a control unit (4) adapted for supplying pressurized oil to said hydraulic activating cylinder, that comprises:
    a structure (17) in which a first (18) and second (19) cylindrical cavity are machined side by side, the first of which has a greater diameter than the second;
    a couple of pistons (21, 22) securely fixed to each other and free to move inside said cavities, a first of which defines, with the lateral surface (23) and with one of the rear surfaces (24) of said first cavity, a first chamber (25), and the second (22) of which defines, with the lateral surface (26) and with one of the rear surfaces (27) of said second cavity (19), a second chamber (28) which is linked to said hydraulic activating cylinder (1);
    an activating terminal (32) for said pistons, free to move axially, substantially in the same direction as the pistons, and connected to the clutch pedal (33), said terminal being housed in an axial hole (36) of a rod (37) securely fixed to said pistons, so as to rest on the rear surface of said hole;
    a mechanically driven flow control valve (38) adapted to enable oil to flow between a pressurized oil source (6) and said first chamber (25) and between said chamber and a discharge outlet (44), at a rate that is proportional to an activating force; a electromagnetically driven pressure control valve (52) adapted to generate, by means of the pressure of said fluid, said activating force for said flow control valve (38), said activating force being proportional to an electrical signal transmitted to the pressure control valve;
    a sensor (53) adapted to generate an electrical signal that is proportional to the force exerted on said clutch pedal (33) and a circuit (5) for activating said pressure control valve (52) connected to said sensor (53) and adapted to emit said electrical signal for said pressure control valve (52) in proportion to said electrical signal emitted by said sensor (53).

2. A device as claimed in claim 1, characterized in that it comprises a third chamber (57) enclosed between said pistons (21, 22) defined by the lateral surfaces (23, 26) of said first (18) and second (19) cavity and by a surface of both pistons, said third chamber being linked with a discharge hole (58) connected to an oil tank.

3. A device as claimed in claim 1 characterized in that said sensor (53) comprises a load cell set in series with said activating terminal (32).

4. A device as claimed in claim 1,
    characterized in that between said activating terminal (32) and said rod (37) of said first and second piston (21, 22) there is placed a first spring (55) adapted to move said terminal away from said rod, a second spring (56) being set between said second piston (22) and said rear surface (27) of said second cavity (19) so as to move the piston away from the surface.

5. A device as claimed in claim 1,
    characterized in that said flow control valve (38) comprises a mobile intercepting member (43) adapted to control the passage clearance of said oil between said fluid source (6) and said first chamber (25) and between said chamber and said outlet (44), said intercepting member being in equilibrium between the force exerted by a spring (48) and said activating force.

6. A device as claimed in claim 1,
    characterized in that said pressure control valve (52) comprises a cavity (50) in which oil circulates at a pressure that is made to vary in proportion to said electrical signal, the pressure inside said cavity being made to act on said mobile intercepting member (43) of said flow control valve (38) to generate said valve activating force.

7. A device as claimed in claim 1,
    characterized in that said hydraulic cylinder (1) comprises a detector (16) adapted to generate an electrical signal indicating the travel covered by the relative piston (7), said detector (16) comprising a sensor (15) that rests on a conical surface (14) securely fixed to said piston.

8. A device as claimed in claim 1, characterized in that said intercepting member (43) of said flow control valve (38) is free to move in a slot machined into said structure (17) of the unit.

* * * * *